US009555746B2

(12) United States Patent
Weihl

(10) Patent No.: US 9,555,746 B2
(45) Date of Patent: Jan. 31, 2017

(54) ADAPTABLE HITCH SYSTEM

(71) Applicant: Hurricane, Inc., Muskegon, MI (US)

(72) Inventor: Ricky A. Weihl, Muskegon, MI (US)

(73) Assignee: Hurricane, Inc., Muskegon, MI (US)

( * ) Notice: Subject to any disclaimer, the term of this patent is extended or adjusted under 35 U.S.C. 154(b) by 0 days.

(21) Appl. No.: 14/753,964

(22) Filed: Jun. 29, 2015

(65) Prior Publication Data

US 2016/0375839 A1 Dec. 29, 2016

(51) Int. Cl.
*B60D 1/07* (2006.01)
*B60R 11/06* (2006.01)
*E01H 5/06* (2006.01)

(52) U.S. Cl.
CPC ............... *B60R 11/06* (2013.01); *E01H 5/061* (2013.01)

(58) Field of Classification Search
CPC ............ E01H 5/06; E01H 5/061; E01H 5/068; B60R 9/06; B60D 1/07; B60D 1/075; B62D 53/0807; B62D 53/0828
See application file for complete search history.

(56) References Cited

U.S. PATENT DOCUMENTS

| 3,698,740 | A | | 10/1972 | Chisholm et al. |
| 3,870,340 | A | | 3/1975 | Winter |
| 3,955,831 | A | | 5/1976 | Whitchurch |
| 4,438,944 | A | | 3/1984 | Della-Moretta |
| 4,577,882 | A | | 3/1986 | Kober et al. |
| 4,940,096 | A | | 7/1990 | Johnson |
| 5,046,271 | A | * | 9/1991 | Daniels ................... E01H 5/068 37/231 |
| 5,392,538 | A | * | 2/1995 | Geerligs ................ E01H 5/061 37/236 |
| 5,433,357 | A | * | 7/1995 | Alliff ....................... B60R 9/06 224/410 |
| 5,930,922 | A | * | 8/1999 | Altheide ................. E01H 5/063 172/684.5 |
| 6,056,308 | A | * | 5/2000 | Harrison .............. A01B 59/064 280/416.1 |
| 6,148,928 | A | | 11/2000 | Spears |
| 6,151,809 | A | | 11/2000 | Altheide |
| 6,481,948 | B2 | | 11/2002 | Spears |
| 6,682,089 | B2 | | 1/2004 | McCoy et al. |

(Continued)

*Primary Examiner* — John Walters
*Assistant Examiner* — Brian Swenson
(74) *Attorney, Agent, or Firm* — Warner Norcross & Judd LLP

(57) ABSTRACT

A vehicle accessory hitch assembly for attaching an accessory to a vehicle. The vehicle may include a frame and a bed mounted to the frame. First and second base rails may be disposed on the bed and coupled to the frame of the vehicle, and the vehicle may include a vehicle trailer hitch with a receiver for accepting a shank. In one embodiment, the vehicle accessory hitch assembly may be mechanically connected to each of the first and second base rails and the vehicle trailer hitch such that the vehicle accessory hitch assembly is immovable or stationary relative to the first and second base rails and the vehicle trailer hitch. In another embodiment, the vehicle accessory hitch assembly may be adaptable to connect to differently-configured base rails and vehicle trailer hitch constructions, including different horizontal and vertical spacing between the base rails and the vehicle trailer hitch.

20 Claims, 10 Drawing Sheets

(56) References Cited

U.S. PATENT DOCUMENTS

| | | | | |
|---|---|---|---|---|
| 6,874,260 B2* | 4/2005 | Mullett | ............... | E01H 5/06 |
| | | | | 172/747 |
| 7,118,053 B2* | 10/2006 | Truan | ............... | A01C 15/005 |
| | | | | 224/519 |
| 2012/0261899 A1 | 10/2012 | Ockunzzi | | |

* cited by examiner

ADAPTABLE HITCH SYSTEM

TECHNICAL FIELD

The present application relates to a hitch system for a vehicle, and more particularly to a hitch system for attaching an implement or accessory to a vehicle.

BACKGROUND

There are a variety of conventional hitch constructions for vehicles. Two of these conventional hitch types have reached a near ubiquitous level of recognition: (1) a trailer hitch having a receiver for receiving a shank and (2) a fifth wheel hitch. A third, less recognized conventional hitch is a custom hitch assembly designed to accommodate a particular vehicle and implement or accessory configuration. Each of these conventional hitches is often times used for one or more particular fields. For example, the conventional trailer hitch in many instances receives a shank attached to an accessory, such as a drawbar with a ball mount located proximate to an end of the shank. Accessory configurations can vary from application to application. To provide some additional examples, the drawbar can be used to tow a boat trailer, or the accessory can be a bike rack or cargo carrier. The conventional trailer hitch provides a single point connection to the vehicle—via the receiver—and therefore the type of accessories used in connection with this conventional trailer hitch are often times limited to accessories that do not require significant lateral stability or significant lateral loads. For example, a conventional trailer hitch is considered effective in towing applications, but less effective in the realm of a plow implement that exerts downward force or is subjected to lateral forces or loads.

The conventional trailer hitch, itself, may be mounted to the rear frame of the vehicle. There are several classes or variations of the trailer hitch, but a 2 in. by 2 in. receiver or a Class III or IV trailer hitch is one of the more common constructions. Many trucks and sport utility vehicles are fitted with such a Class III or IV trailer hitch. The Class of this type of conventional trailer hitch is generally indicative of the weight capacity of the hitch and the receiver size. There are several additional classes, such as Class I or Class V, trailer hitches available, depending on the application and desired weight carrying capacity.

The fifth wheel hitch, another conventional hitch, can be used in various towing applications, such as to tow a semi-trailer or recreational vehicle. The fifth wheel hitch utilizes a single point connection like the conventional trailer hitch, but, in some cases, provides greater towing stability over the conventional trailer hitch. Rather than the receiver and shaft construction of the trailer hitch, the conventional fifth wheel hitch utilizes a horseshoe shaped coupler that rotates to capture a kingpin mounted to the accessory being linked to the fifth wheel hitch. The conventional fifth wheel hitch construction is used in nearly all semi-trailer trucks or tractors on the road today in the U.S. The conventional fifth wheel hitch construction has also been used in the realm of pickup trucks or a truck having an open bed. The fifth wheel hitch can be mounted on two rails located on the truck bed and coupled to the frame of the truck through the truck bed. Because trucks of different makes can have different dimensions, the position of the rails, and therefore the fifth wheel hitch, within the truck bed often times varies between truck makes. Although the conventional fifth wheel hitch may offer additional stability over the conventional vehicle trailer hitch, conventional fifth wheel hitches, like the conventional vehicle trailer hitch, are used primarily for towing, and therefore tend to be less stabile when subjected to lateral loads. Further, the kingpin is allowed to rotate within the fifth wheel to facilitate traversing turns while towing an accessory, such as a trailer. In this way, the accessory is capable of rotating or pivoting about the fifth wheel.

In circumstances in which a hitch accessory or implement is not configured to interface with a conventional trailer hitch or fifth wheel hitch, a custom hitch can be constructed according to the specific dimensions of the hitch accessory and the vehicle to which the hitch accessory or implement is being attached. For example, custom hitches are often times used in conjunction with rear mounted snowplow accessories. As mentioned herein, trucks of different makes can have different dimensions, such as different frame locations and truck bed configurations. Because rear mounted snowplow accessories can be subjected to lateral loads or configured to exert downward forces, the single point connection offered by the conventional trailer hitch or fifth wheel hitch can be insufficient to provide an effective connection. The custom hitch may include more than one connection point, and therefore is considered to offer stability over these conventional standard hitches. However, construction of a custom hitch in many cases is laborious and involves custom fabrication of a construction specific to both the make of vehicle and the snowplow dimensions. Further, reuse of the custom hitch in connection with a different vehicle make or a different snowplow can be encumbered or impossible without significant effort or rework of the custom hitch. As a result, upgrades to vehicles or snowplows within a fleet of snowplow vehicles can be costly in terms of additional labor to construct new custom hitches.

SUMMARY OF THE DESCRIPTION

The present disclosure is directed toward a vehicle accessory hitch assembly for attaching an accessory to a vehicle. The vehicle may include a frame and a bed mounted to the frame. First and second base rails may be disposed on the bed and coupled to the frame of the vehicle, and the vehicle may include a vehicle trailer hitch with a receiver for accepting a shank. In one embodiment, the vehicle accessory hitch assembly may be mechanically connected to each of the first and second base rails and the vehicle trailer hitch such that the vehicle accessory hitch assembly is immovable or stationary relative to the first and second base rails and the vehicle trailer hitch. In another embodiment, the vehicle accessory hitch assembly may be adaptable to connect to differently-configured base rails and vehicle trailer hitch constructions, including different horizontal and vertical spacing between the base rails and the vehicle trailer hitch.

In one aspect, the vehicle accessory hitch assembly may include a first member opposing a second member, where each of the first and second members includes a bed section and a rear section. The bed section may be configured to extend along the bed of the vehicle, and the rear section may be configured to be in proximity to the rear of the vehicle. Each bed section of the first and second members may fixedly couple to the first and second base rails of the vehicle. The vehicle accessory hitch assembly may further include a hitch support fixedly coupled to the rear section of the first member and the rear section of the second member. The hitch support may include a shank member configured to interface with the receiver of the vehicle trailer hitch. With this configuration, the vehicle accessory hitch assembly may be configured to fixedly couple to the first base rail of the vehicle and the second base rail of the vehicle. In one embodiment, the vehicle trailer hitch assembly may be fixedly coupled to these components of the vehicle such that the vehicle accessory hitch assembly is immovable or stationary relative to the first base rail, the second base rail, and the vehicle trailer hitch.

In one embodiment, the vehicle accessory hitch assembly may include an accessory support fixedly coupled to the first member, the second member and the hitch support, where the accessory support may be configured to connect to and support a vehicle accessory near the rear of the vehicle.

The vehicle accessory hitch assembly in one embodiment may be adaptable such that different horizontal and vertical spacing between the base rails and the vehicle trailer hitch may be accommodated. The bed sections of the first and second members may be adjustable in length enabling use of the vehicle accessory hitch assembly with different horizontal spacing between the base rails and the vehicle trailer hitch (or the rearmost part of the vehicle). For example, the spacing between the base rails and the vehicle trailer hitch may be longer for one vehicle than another vehicle. Because the bed sections may be adjustable in length, several different types of vehicle configurations may be used in conjunction with the vehicle accessory hitch assembly. The hitch support of the vehicle accessory hitch assembly may be constructed to allow vertical adjustment of the shank relative to the bed sections of the first and second members. Similar to the distance or spacing between the base rails and the vehicle trailer hitch, the position of the vehicle trailer hitch relative to the bed of the vehicle may be different for one vehicle than another vehicle. In being configured to allow vertical adjustment of the shank, the vehicle accessory hitch assembly may be fitted to both vehicles.

In one aspect, a method of attaching a vehicle accessory hitch to the vehicle includes fixedly coupling a first hitch member to each of the first and second base rails such that the first hitch member is stationary relative to the first and second base rails, where the first hitch member includes a first bed section extending along the bed of the vehicle and includes a first rear section disposed in proximity to a rear of the vehicle.

The method further includes fixedly coupling a second hitch member to each of the first and second base rails such that the first hitch member is stationary relative to the first and second base rails, the second hitch member being in an opposing position relative to the first hitch member, and where the first hitch member includes a second bed section extending along the bed of the vehicle and includes a second rear section disposed in proximity to a rear of the vehicle. The method may also include attaching an accessory support to the first and second hitch members, the accessory support being configured to enable mounting of a vehicle accessory to the vehicle accessory hitch, and inserting a shank member into the receiver of the vehicle trailer hitch to aid in mechanically stabilizing the first and second hitch members relative to the vehicle trailer hitch. The shank member may be stationary relative to the accessory support.

In one aspect, a vehicle accessory hitch assembly may be fitted to several different make and model vehicles, each with potentially different constructions. The vehicle accessory hitch assembly may be adaptable to the different make and model vehicles thereby potentially avoiding fabrication of a custom hitch for each vehicle. Reuse of the vehicle accessory hitch assembly with different vehicles may be possible because the vehicle hitch is adaptable. Further, vehicle accessory hitch assembly may be mechanically connected to several parts of the vehicle in a manner that withstands substantial transverse loading or in an immovable, stationary manner.

These and other advantages and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION

Figure 1:
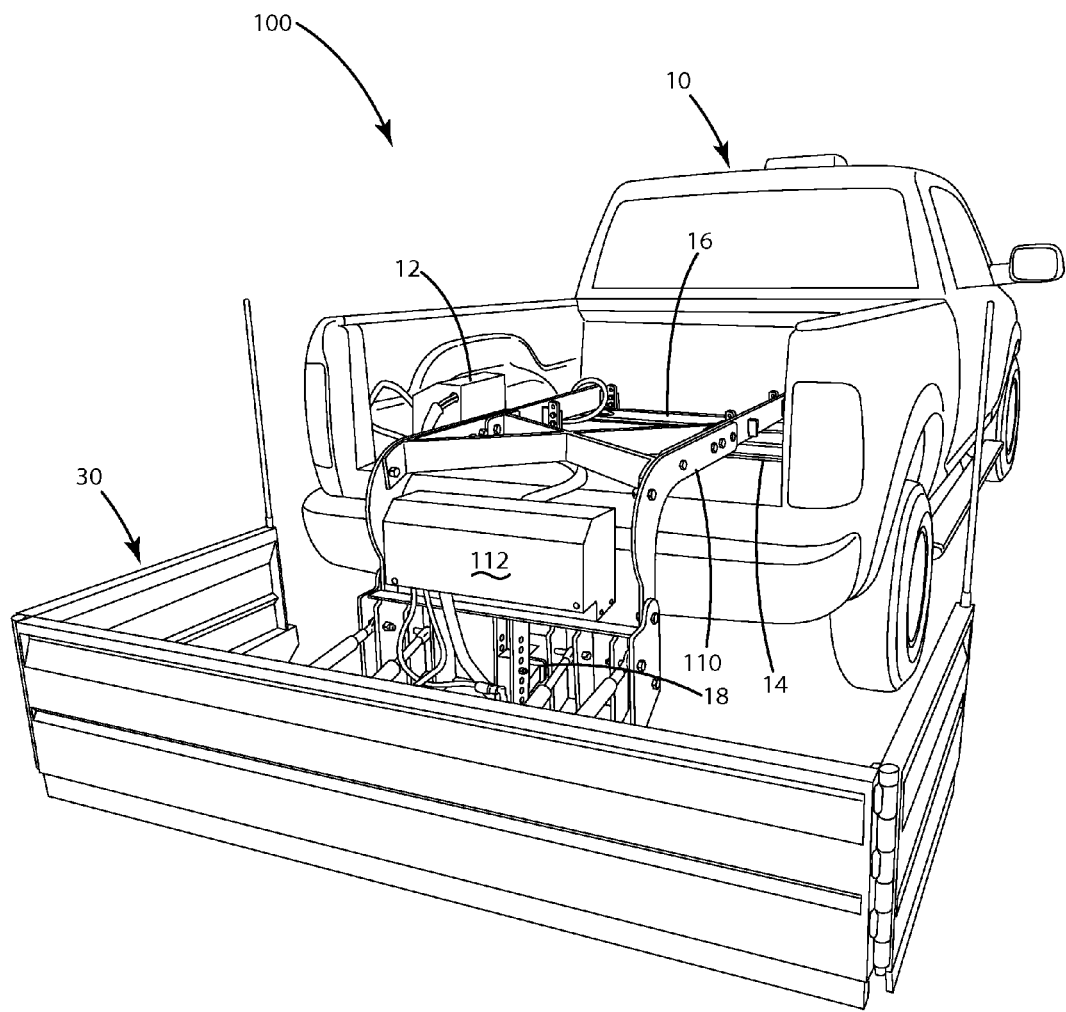
FIG. 1 shows a vehicle accessory hitch assembly according to a current embodiment.

An accessory hitch system for attaching an accessory to a vehicle is shown in FIG. 1, and is generally designated 100. The accessory hitch system 100 includes a vehicle accessory hitch assembly 110, a vehicle 10 and an accessory 30. The vehicle accessory hitch assembly 110 may be connected to the vehicle 10 in a variety of ways, as discussed herein, and may facilitate attachment of the accessory 30 to the vehicle 10. In one aspect, the vehicle accessory hitch assembly 110 may be coupled to the vehicle frame and a vehicle trailer hitch 18 in a fixed manner such that the vehicle accessory hitch assembly 110 is substantially immovable relative to the vehicle frame and the vehicle trailer hitch 18. In another aspect, the vehicle accessory hitch assembly 110 may be adjustable to accommodate different spacing between the frame mounting points and the vehicle trailer hitch. Different vehicle heights may also be accommodated by adjustment.

In the illustrated embodiment, the accessory hitch system 100 may include a control system 12 configured to allow an accessory operator to control operation of the accessory 30, including, for example, enabling control over one or more actuators coupled between the vehicle accessory hitch assembly 110 and the accessory 30. The control system 12 may operate in conjunction with an accessory actuator system 112 to control operation of the accessory 30. The accessory actuator system 112 may be operably connected to the accessory 30 to receive and carry out instructions from the control system 12. The accessory actuator system 112, in one embodiment, may transmit information (e.g., diagnostic information or status information, or both) to the control system 12.

For purposes of disclosure, the accessory 30 is shown as a rear mounted snowplow, but it should be understood that the accessory 30 may be any type of accessory or implement. Some example accessories or implements include cargo carriers, storage boxes, trailers and agricultural implements.

Figure 3:
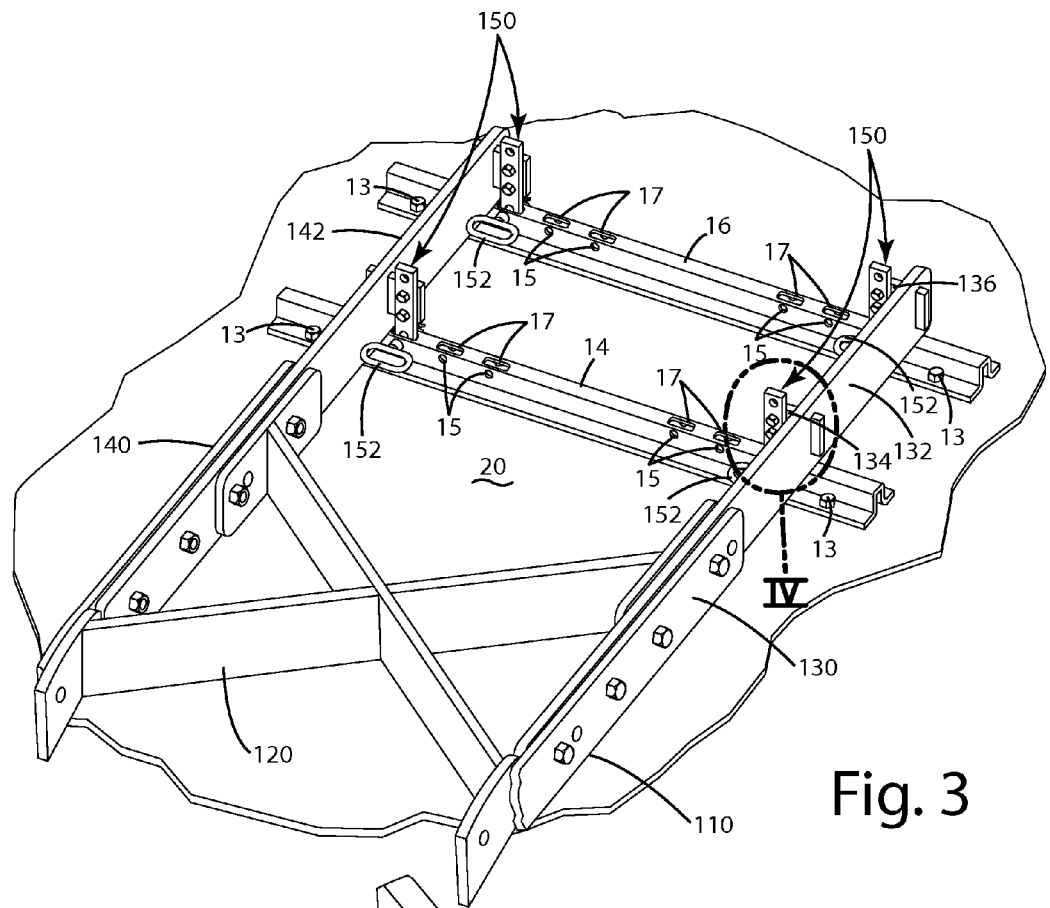
FIG. 3 shows a partial view of the vehicle accessory hitch assembly.
Figure 4:
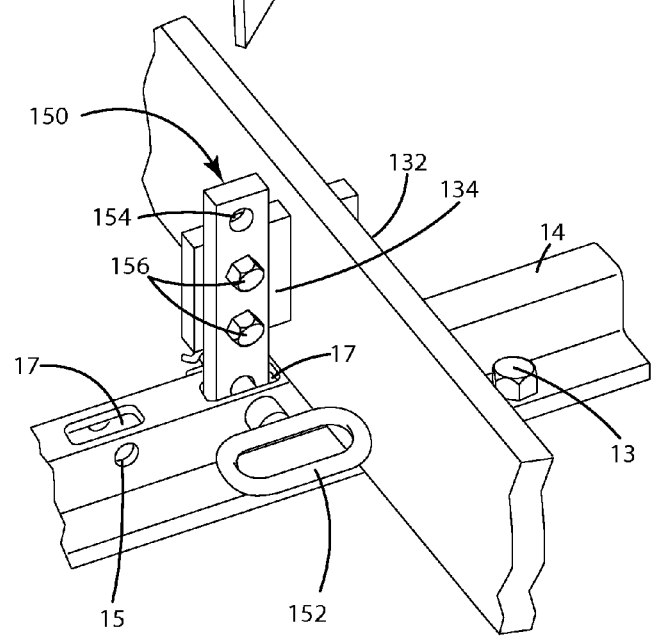
FIG. 4 shows an enlarged view of a connection member of the vehicle accessory hitch assembly of FIG. 3.

In the illustrated embodiment of FIG. 1, and as shown in further detail in FIG. 3, the accessory hitch system 100 may include a first base rail 14 and a second base rail 16 disposed on a bed 20 of the vehicle 10, and coupled to the frame (not shown) of the vehicle. The first and second base rails 14, 16 may include several aperture and hitch pin hole configurations enabling various connection configurations between the first and second base rails 14, 16 and a vehicle accessory hitch assembly 110. Apertures 17 of the first and second base rails 14, 16 may be spaced along the length of the first and second base rails 14, 16, and hitch pin holes 15 may be transversely aligned with the apertures 17 to facilitate a mechanical connection between the first and second base rails 14, 16 and a coupler 150 of the vehicle accessory hitch assembly 110. By having a plurality of apertures 17 and associated hitch pin holes 15, the first and second base rails 14, 16 may accommodate different connection configurations. It should be understood that the first and second base rails 14, 16 may be configured differently to include more or fewer apertures 17 and associated hitch pin holes 15.

In the illustrated embodiment, the apertures 17 of the first and second base rails 14, 16 are configured to receive an end of the coupler 150, which may include a coupler hole 154, 158 that, after being inserted into one of the apertures 17, aligns with the hitch pin holes 15. A hitch pin 152 can be inserted through the hitch pin holes 15 and the coupler hole 154, 158 to form a mechanical connection between the first and second base rails 14, 16 in the vehicle accessory hitch assembly 110.

The first and second base rails 14, 16 may be mechanically coupled to a frame (not shown) of the vehicle 10 using one or more fasteners. In many cases, vehicle manufacturers provide mounting locations for rails, such as the first and second base rails 14, 16, to the vehicle frame. This practice is often implemented in connection with pickup trucks, similar to the pickup truck shown in FIG. 1. The first and second base rails 14, 16 can be fastened to the mounting locations through the bed of the vehicle. In this way, a rigid mechanical connection can be formed between the first and second base rails 14, 16 and the frame of the vehicle 10. Vehicle constructions often differ between makes and models, and so the mounting locations for the first and second base rails 14, 16 for one model vehicle may be different from that of another model vehicle. As a result, the distance between the rear of the vehicle and the mounted position of the first and second base rails 14, 16 may vary among vehicle makes and models. Likewise, the distance between the mounted position of the first and second base rails 14, 16 and the vehicle trailer hitch 18 may vary among vehicle makes and models. As discussed herein, the vehicle accessory hitch 110 may be adjustable to accommodate such variations among vehicle makes and models.

In one embodiment, the first and second base rails 14, 16 may be conventional rails configured to connect with a fifth wheel hitch, such as the conventional fifth wheel rails sold by Reese®, and conventionally known as Reese® fifth wheel rails. In this embodiment, the distance between the first and second base rails 14, 16 may be a standard distance sized to accommodate the conventional mounting spacing for the conventional fifth wheel hitch, which, as discussed above, provides a single point about which an accessory can rotate. Although the spacing between the first base rail 14 and the second base rail 16 may be standard in this embodiment, the distance between (a) the first and second base rails 14, 16 and (b) the rear of the vehicle may vary among vehicle makes and models, as discussed above.

Figure 2:
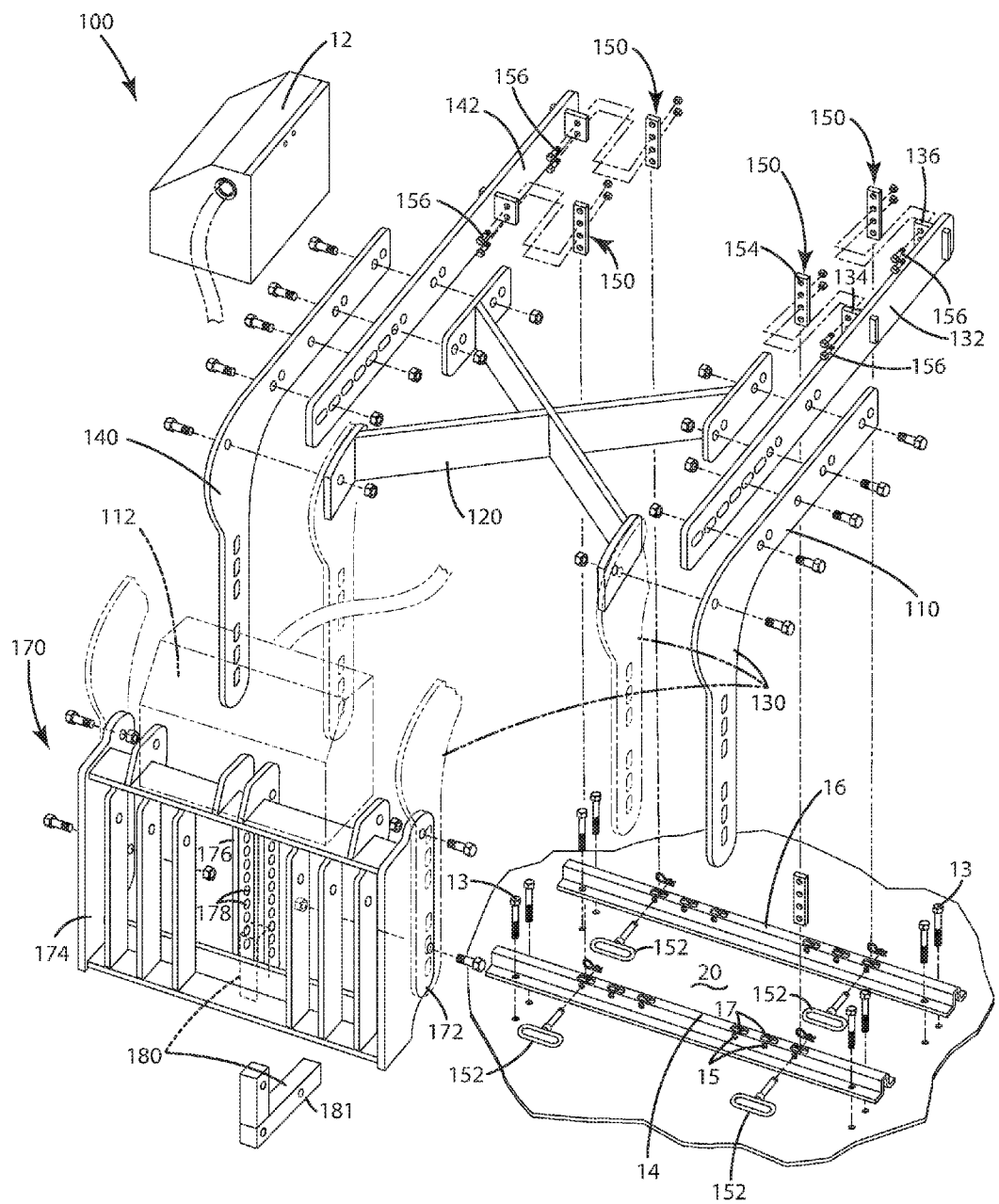
FIG. 2 shows an exploded view of the vehicle accessory hitch assembly.

The vehicle accessory hitch assembly 110 is shown in further detail in the illustrated embodiments of FIGS. 2 and 3. In the illustrated embodiments, the vehicle accessory hitch assembly 110 may include a first beam 130, a second beam 140, a first elongate member 132, a second elongate member 142, a brace 120, an accessory support 170 and a hitch support 180. A vehicle accessory hitch assembly 110 according to one embodiment may enable a rigid, immovable connection between (a) the vehicle accessory hitch assembly 110 and (b) the first base rail 14, the second base rail 16, and the vehicle trailer hitch 18.

The vehicle accessory hitch assembly 110 may be adjustable or adaptable to accommodate different spacing or distances among one or more of the first base rail 14, the second base rail 16, and the vehicle trailer hitch 18. For example, the first beam 130 and the first elongate member 132 may be fastened to each other to form a first hitch member having a bed section disposed in proximity to and extending substantially along the bed 20 of the vehicle 10, and having a rear section in proximity to the rear of the vehicle 10. The rear section of the first hitch member may overhang at least a portion of the rear of the vehicle 10. To accommodate different distances between the first and second base rails 14, 16 and the rear of the vehicle, the bed section of the first elongate member may be variable in length. In particular, the first beam 130 and the first elongate member 132 may be configured to connect to each in a plurality of positions such that the overall length of the bed section, formed in connecting the first beam 130 in the first elongate member 132, may vary. The second beam 140 and the second elongate member 142 may be constructed in a manner similar to the first beam 130 and the first elongate member 132, and may be fastened to each other to form a second hitch member having a bed section disposed in proximity to and extending along the bed 20 of the vehicle 10, and having a rear section in proximity to the rear of the vehicle 10. The bed sections and the rear sections, or a subset thereof, of the first and second hitch members may be immovably attached to the vehicle 10. Because the first and second hitch members are spaced apart from each other, and/or because each of the first and second members is coupled to the first base rail 14, the second base rail 16, and the vehicle trailer hitch 18, the vehicle accessory hitch assembly 110 may be capable of withstanding transverse loading on the accessory 30, or loading generally parallel to a side of the vehicle 10.

Figure 11:
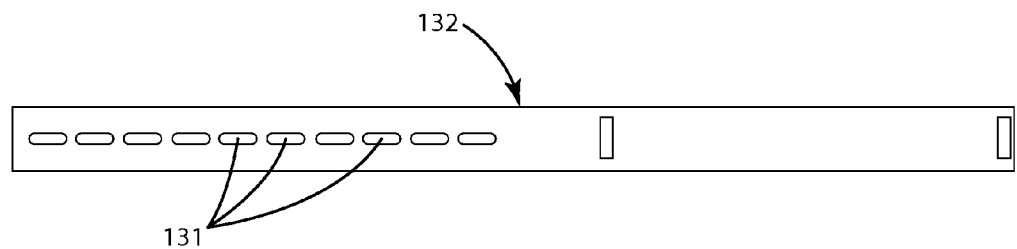
FIG. 11 shows a side view of an elongate member of the vehicle accessory hitch assembly.
Figure 12:
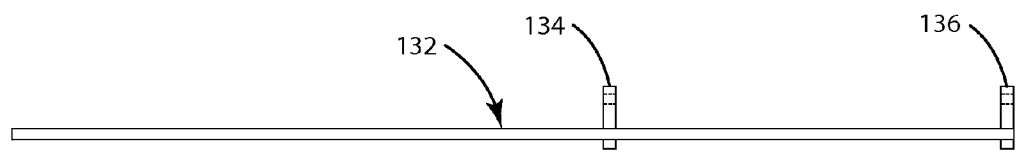
FIG. 12 shows a top view of the elongate member of the vehicle accessory hitch assembly.
Figure 13:
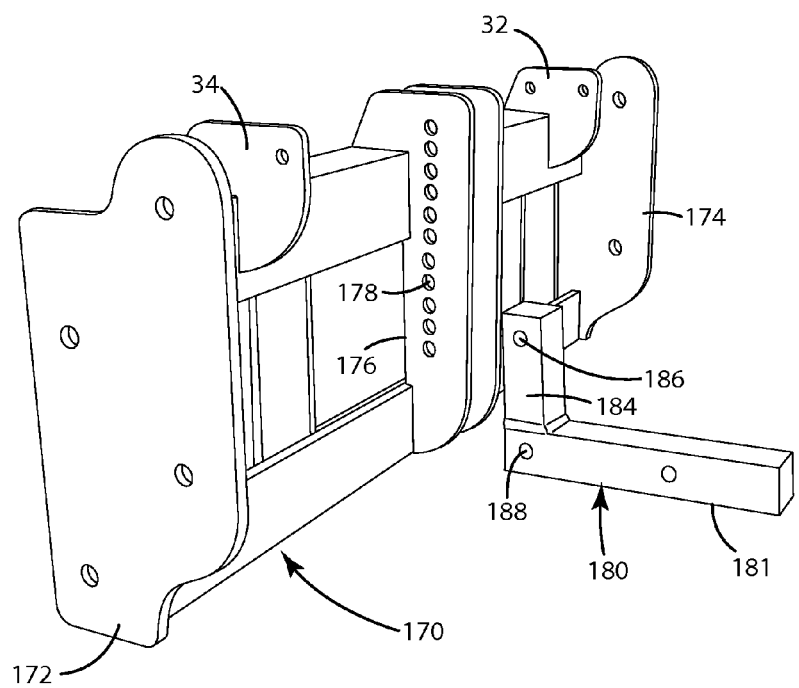
FIG. 13 shows a perspective view of an implement mount and a shank member of the vehicle accessory hitch assembly.
Figure 14:
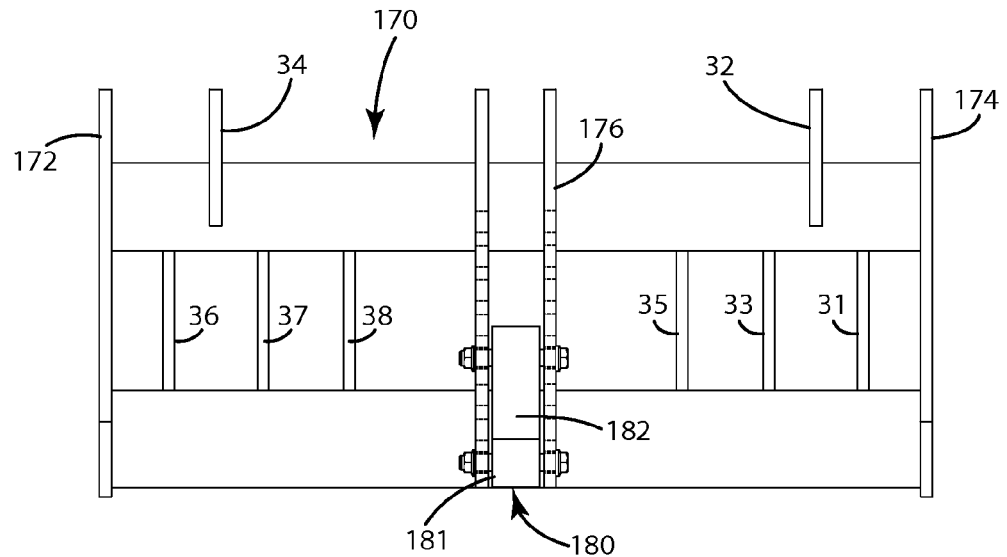
FIG. 14 shows a rear view of the implement mount and the shank member of the vehicle accessory hitch assembly.
Figure 15:
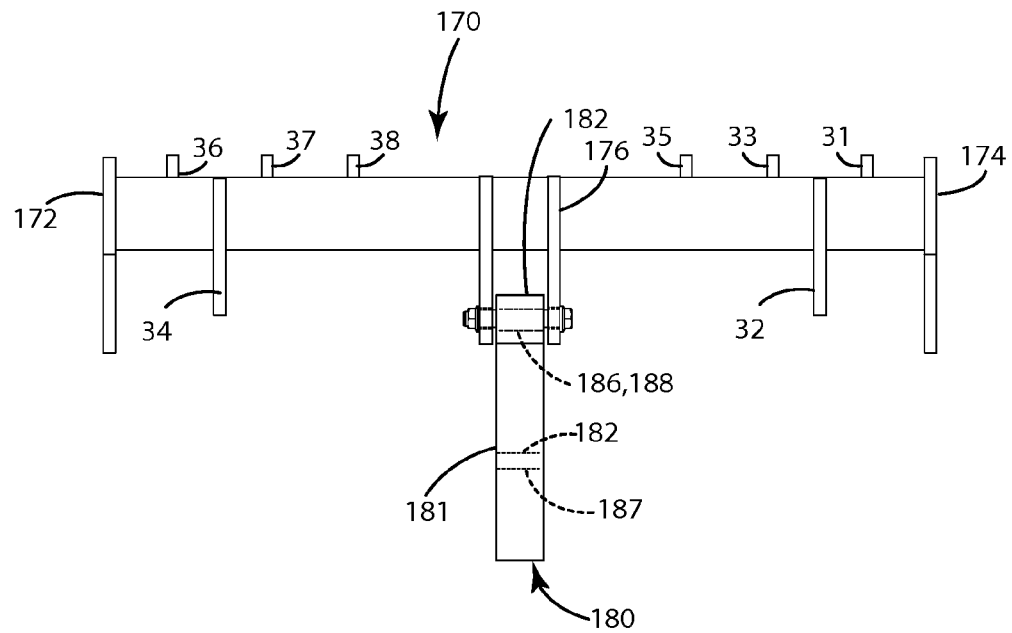
FIG. 15 shows a top view of the implement mount and the shank member of the vehicle accessory hitch assembly.
Figure 17:
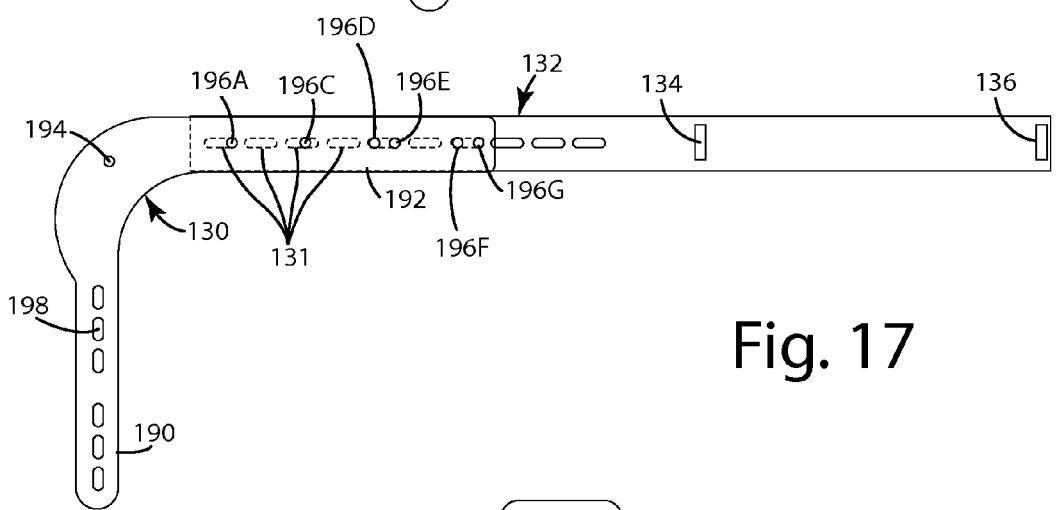
FIG. 17 shows a side view of the beam member and the elongate member of the vehicle accessory hitch assembly.

The first elongate member 132 according to one embodiment is shown in FIGS. 11, 12 and 17. The first elongate member 132 may include a first connection member 134 and a second connection member 136 disposed transverse to a longitudinal axis of the first elongate member 132. In the illustrated embodiment, in manufacturing the first elongate member 132, the first and second connection members 134, 136 may be inserted within respective slots, and then welded in place. The first and second connection members 134, 136 may provide attachment points for connecting the first elongate member 132 to the first and second base rails 14, 16. For example, the first connection member 134 may be fastened to a coupler 150 configured to attach to the first base rail 14 using a hitch pin 152, as discussed herein. And, the second connection member 136 may be fastened to another coupler 150 configured to attach to the second base rail 16 using a hitch pin 152, as discussed herein. It should be understood that the present disclosure is not limited to a particular type of coupling or connection between the first elongate member 132 and the first and second base rails 14, 16, and that any type of coupling or connection may be used.

Figure 18:
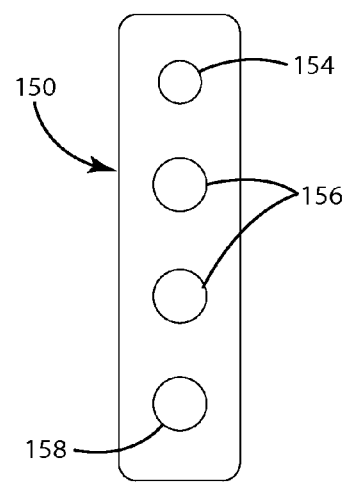
FIG. 18 shows a coupler of the vehicle accessory hitch assembly.

In the illustrated embodiment of FIGS. 11 and 18, the first elongate member 132 may include a plurality of slots 131. The plurality of slots 131 may be spaced from one another along the longitudinal axis of the first elongate member 132. In this way, the plurality of slots 131 may provide a plurality of locations along the longitudinal axis at which the first elongate member 132 can be connected to the first beam 130. In the illustrated embodiment, the plurality of slots 131 are each approximately 2 inches in length, and spaced approximately 1 inch from each other along the longitudinal axis of the first elongate member 132. The length of the slots 131 and the spacing therebetween may vary depending on the configuration.

Figure 5:
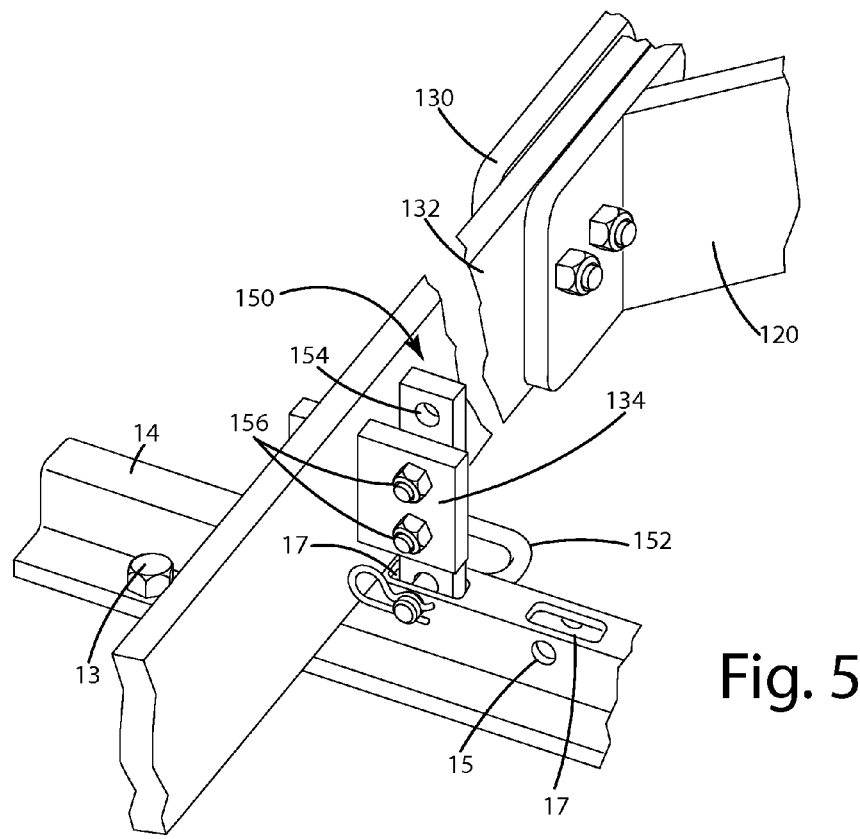
FIG. 5 shows an enlarged, perspective view of the connection member of FIG. 4.
Figure 6:
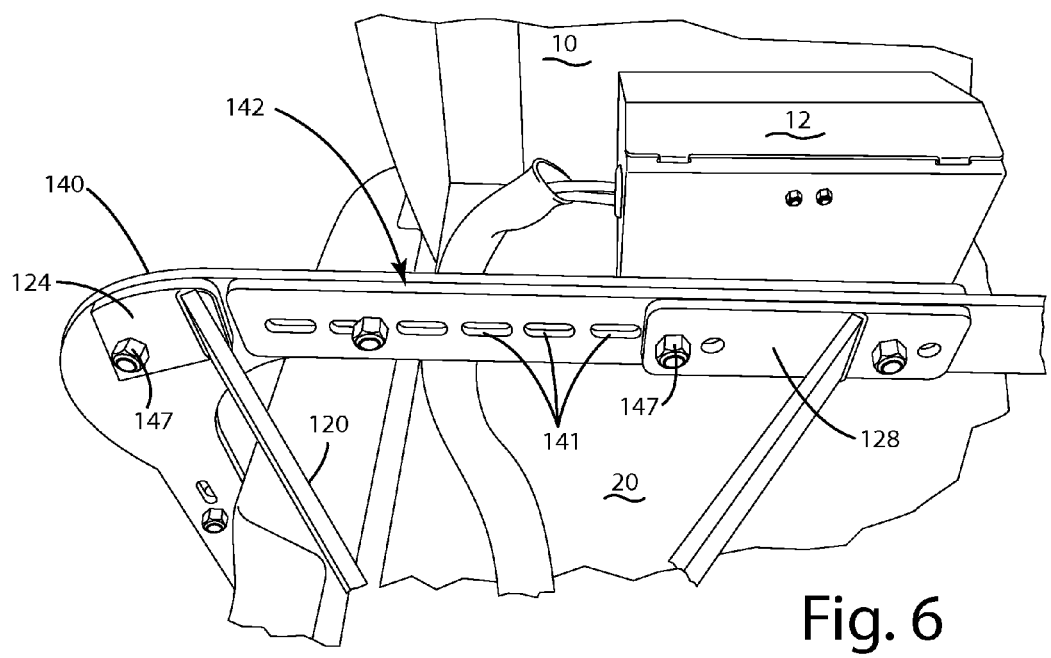
FIG. 6 shows a partial, perspective view of the vehicle accessory hitch assembly.
Figure 7:
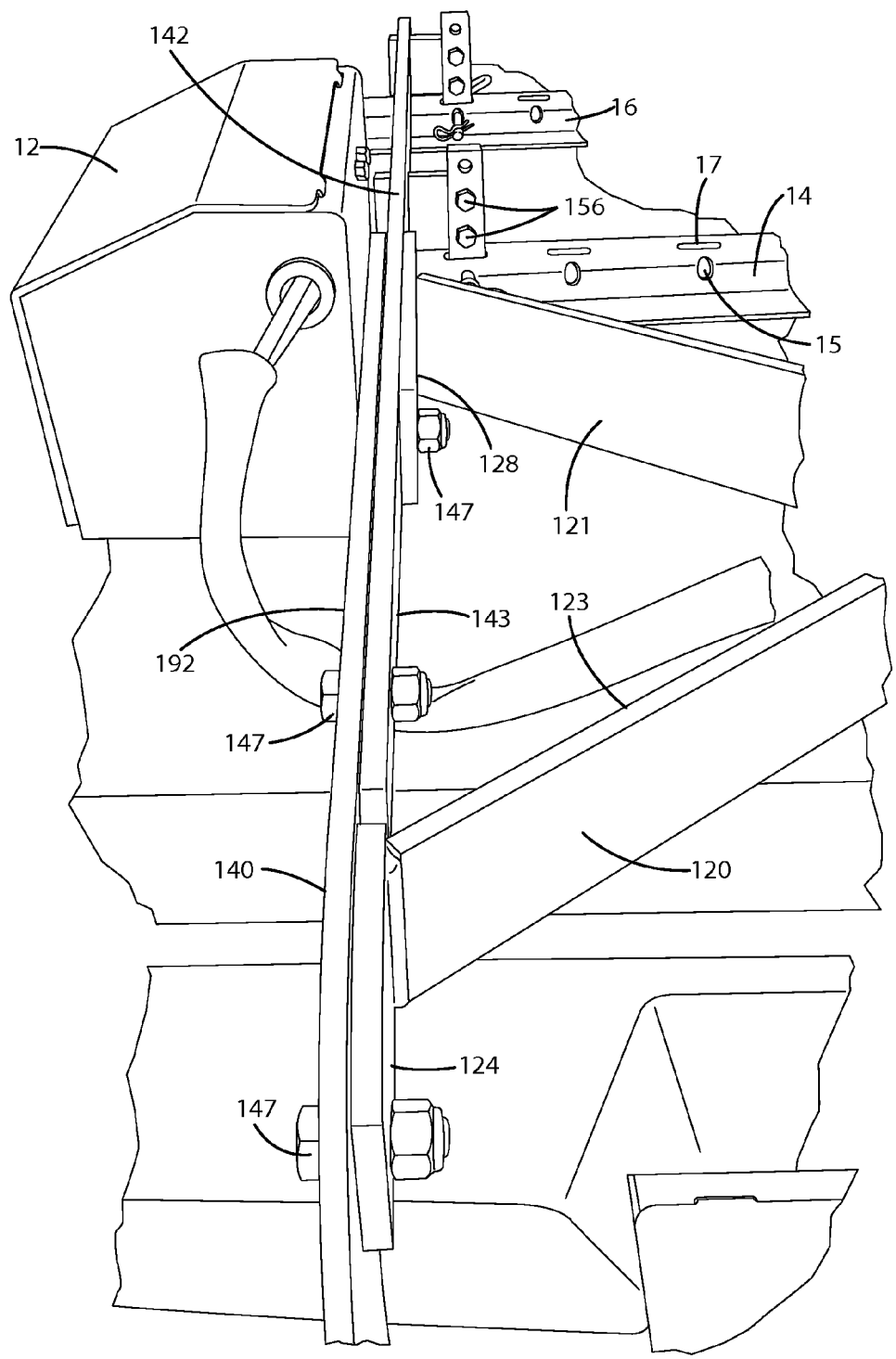
FIG. 7 shows a partial, perspective view of the vehicle accessory hitch assembly.
Figure 8:
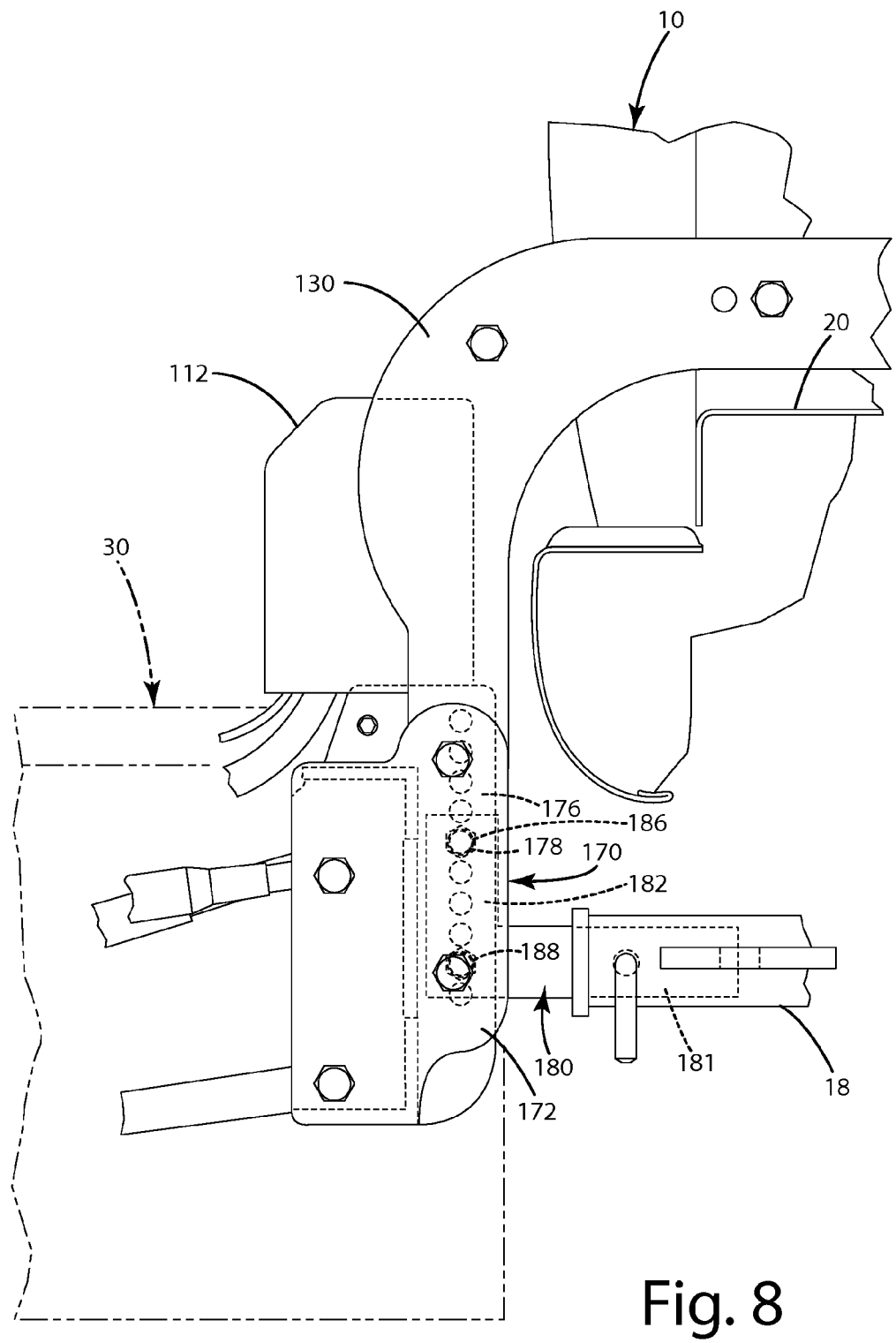
FIG. 8 shows a partial side view of the vehicle accessory hitch assembly.

A second elongate member 142, in one embodiment, may be substantially identical to the first elongate member 132, and is shown connected to a second beam 140 in the illustrated embodiments of FIGS. 5 and 6 in a manner similar to the connection between the first elongate member 132 and the first beam 130. The first elongate member 132 may be symmetrical about the longitudinal axis such that, by flipping the first elongate member 132, the first elongate member 132 may be used as the second elongate member 142, and may be mounted to the first and second base rails 14, 16 in proximity to the bed 20 in a manner that opposes the first elongate member 132. As a result, the first and second elongate members 132, 142 can be respectively manufactured as one component.

The first beam 130 according to one embodiment is shown in FIGS. 17 and 18. In the illustrated embodiment, the first beam 130 may comprise a bed member 192 and a support member 190. The bed member 192 may be constructed to be fastened to the first elongate member 132 such that the bed member 192 is substantially aligned with the longitudinal axis of the first elongate member 132. The support member 190 and the bed member 192 may form a right angle such that, when installed on the vehicle 10, the bed member 192 is in proximity to the rear of the vehicle and substantially perpendicular to a plane defined by the bed 20 or the ground over which the vehicle 10 is disposed. It should be understood that the present disclosure is not limited to a right angle or perpendicular configuration, and that the angle between the bed member 192 and the support member 190 may vary from configuration to configuration. For example, among different constructions, the angle may vary from 0° to 100° relative to the longitudinal axis of the bed member 192. In practical terms, the support member 190 may be configured in any manner that enables the vehicle accessory hitch assembly 110 to be attached to the first and second base rails 14, 16 and the vehicle trailer hitch 18.

The first beam 130 may include a plurality of mounting holes 196A-G spaced apart from one another, and capable of interfacing with a fastener, such as a bolt and nut, to fasten the first beam 130 the first elongate member 132. The plurality of mounting holes 196 A-G may be spaced in a manner to correspond with the plurality of slots 131 so that at least two of the mounting holes 196 A-G may be aligned with corresponding slots 131 irrespective of the relative position between the first beam 130 and the first elongate member 132. In other words, in one embodiment, over a range extending from the longest to shortest configuration of the bed section formed by the first beam 130 and the first elongate member 132, the positions of the plurality of slots 131 and the mounting holes 196A-G may enable substantially unlimited adjustability while enabling a substantially firm mechanical connection therebetween. In the illustrated embodiment, the mount holes 196A-B are 2 inches apart, center to center. Likewise, the mounting holes 196D-E and the mounting holes 196F-G are respectively 2 inches apart, center to center. The mounting holes 196B-C, the mounting holes 196C-D are the mounting holes 196E-F are respectively 8 inches apart, center to center. It should be understood that the spacing among the mounting holes 196A-F may vary from application to application.

The support member 190 of the first beam 130 may include a plurality of slots 198 configured to align with mounting holes of the accessory support 170 so that the accessory support 170 can be fastened to the first beam 130. The plurality of slots 198 may be generally spaced and configured in a manner similar to the slots 131. However, at least two of the plurality of slots 198 may have a different spacing from the other plurality of slots 198 to facilitate adjustability in mounting the accessory support 170 relative to the first beam 130.

The first beam 130 may also include a brace mounting hole 194 that aligns with a corresponding mounting hole in the brace 120 so that the brace 120 can be affixed to the first beam 130 using a fastener, such as a bolt and nut 147.

Figure 16:
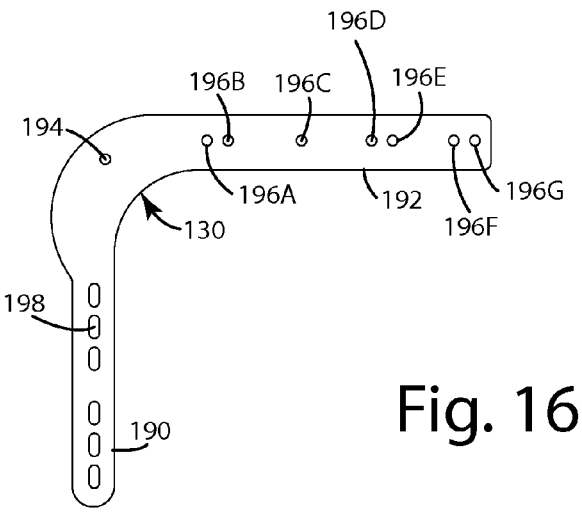
FIG. 16 shows a side view of a beam member of the vehicle accessory hitch assembly.

In the illustrated embodiment, the transition between the bed member 192 and the support member 190 is continuous or formed without the use of a mechanical joint between the bed member 192 in the support member 190. The inside and outside radiuses of the transition, in the illustrated embodiment of FIG. 16, may be different so that additional material may be incorporated into the transition, thereby strengthening the transition between the bed member 192 and the support member 190. In this way, a mechanical joint between the bed member 190 and the support member 192 may be avoided, and the first beam 130 can be manufactured with the bed member 192 and the support member 190 as a single component.

Similar to the first and second elongate members 132, 142, the first beam 130 may be substantially identical to the second beam 140. As a result, the first beam 130 and the second beam 140 may be interchangeable. It should be understood, however, that, like the first and second elongate members 132, 142, the first and second beams 130, 140 may be configured differently from each other.

Figure 9:
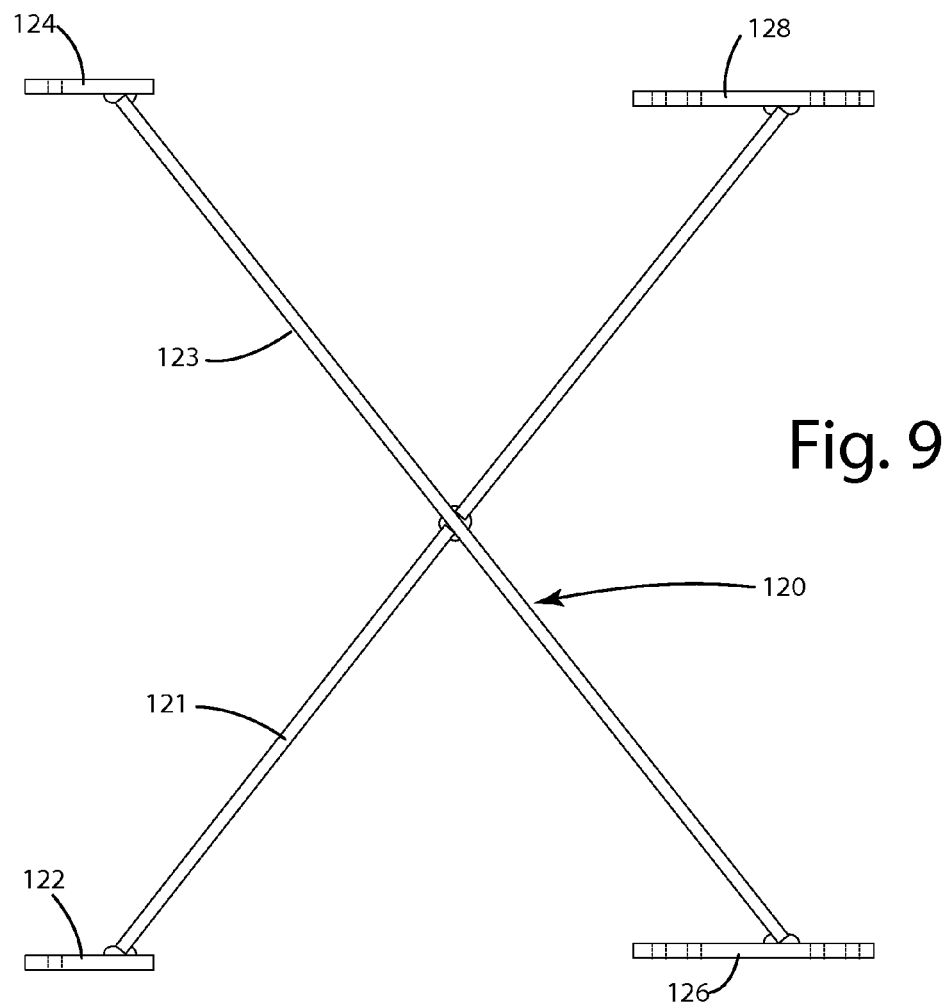
FIG. 9 shows a top view of a brace of the vehicle accessory hitch assembly.
Figure 10:
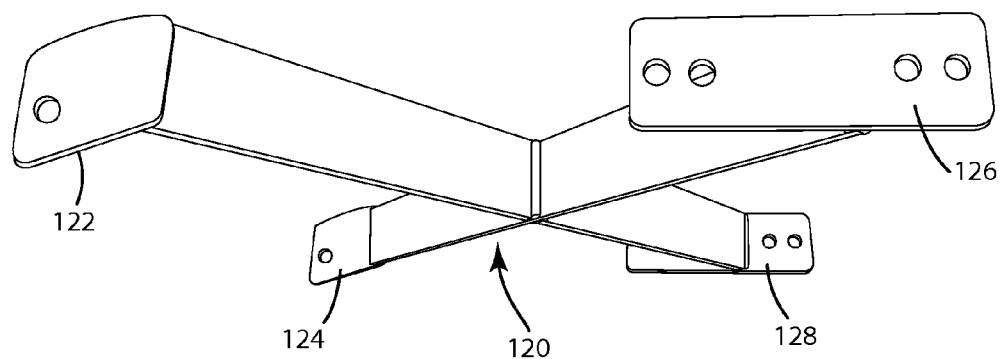
FIG. 10 shows a perspective view of the brace of the vehicle accessory hitch assembly.

In the illustrated embodiment of FIGS. 3 and 9-10, the vehicle accessory hitch assembly 110 includes a brace 120 disposed between (a) the first beam 130 and the first elongate member 132 and (b) the second beam 140 and the second elongate member 142. The brace 120 may be sized to couple to inside, opposing faces of the first elongate member 132 and the second elongate member 142, and to couple to inside opposing faces of the first beam 130 and the second beam 140. The brace 120 may be formed by overlapping and welding two members 121, 123 in a cross-halved joint configuration. Each end of the members 121, 123 may be connected to a mounting plate 122, 124, 126, 128. In the illustrated embodiment, the mounting plates 126, 128 are configured to be mechanically fastened to the first and second elongate members 132, 142, respectively. And, the mounting plates 122, 124 are configured to be mechanically fastened to the first and second beams 130, 140, respectively. As discussed herein, the vehicle accessory hitch assembly 110 may be configured to resist transverse loading, or loads applied in a direction perpendicular to a side of the vehicle 10. Incorporation of the brace 120, and its attachment to the first and second elongate members 132, 142 and the first and second beams 130, 140 may further strengthen the vehicle accessory hitch assembly 110 against such transverse loading. The mounting plates 122, 124, 126, 128 may include mounting holes configured and spaced in a manner similar to the mounting holes described herein in connection with the first and second elongate members 132, 142 and the first and second beams 130, 140.

In the illustrated embodiments of FIGS. 2, 8 and 13-15, the accessory support 170 of the vehicle accessory hitch assembly 110 is shown in further detail. The accessory support 170 may include a first end plate 172, a second end plate 174 and a shank mount 176 disposed between the first end plate 172 and the second end plate 174. The first end plate 172 may be affixed to the support member 190 of the first beam 130, and the second end plate 174 may be affixed to the support member 190 of the second beam 140. It should be understood that these components can be affixed together in a variety of ways; in the illustrated embodiment, a bolt and nut fastener in conjunction with slots and mounting holes are used. However, the present disclosure is not so limited. With the accessory support 170 being mounted to the support members 190 of the first and second beams 130, 140, the accessory support 170 may be positioned near the rear of the vehicle 10. In particular, in one embodiment of this configuration, the accessory support 170 may be positioned and held at the rear of the vehicle 10.

To further support the vehicle accessory hitch assembly 110, including the accessory support 170, a hitch support 180 may be affixed to the shank mount 176 of the accessory support 170, and may include a shank 181 receivable by the vehicle hitch 18. With this configuration, the hitch support 180 may mechanically connect the accessory support 170 to the vehicle trailer hitch 18, thereby coupling the vehicle accessory hitch assembly 110, and components thereof, to the vehicle trailer hitch 18.

As discussed herein, the support members 190 of the first and second beams 130, 140 may include a plurality of slots 198 configured to accept a fastener, such as a bolt and nut fastener, that allow formation of a mechanical connection between the support members 190 and the first and second end plates 172, 174 of the accessory support 170. The first and second end plates 172, 174 may include corresponding mounting holes configured to align with one or more of the slots 198 so that the mechanical connection may be formed.

The distance between the bed 20 of the vehicle 10 and the vehicle trailer hitch 18 may vary from application to application. For example, this distance for one make and model vehicle may be different from another make and model vehicle. Because this distance may vary, when the first and second elongate members 132, 142 and the first and second beams 130, 140 are coupled to the first and second base rails 14, 16, the distance from the bed sections of this configuration to the vehicle trailer hitch 18 may also vary.

In an effort to achieve an adaptable vehicle accessory hitch capable of being adjusted for use with more than one vehicle make and model, the hitch support 180 may be mountable in a plurality of positions relative to the shank mount 176 of the accessory support 170. The plurality of available positions for the hitch support 180 in conjunction with the accessory support 170 being mountable in a plurality of positions to the first and second beams 130, 140 may enable the accessory support 170 and the hitch support 180 to be positioned so that the shank 181 of the hitch support 180 may be aligned with and received by the vehicle trailer hitch 18. The shank 181 may include a vehicle hitch pin hole 187 configured to align with a corresponding set of holes in the vehicle trailer hitch 18, and to accept a hitch pin to secure the shank 181 within the vehicle trailer hitch 18. To provide a plurality of mounting positions for the hitch support 180, a mounting member 182 of the hitch support 180 may include a plurality of mounting holes 186, 188 capable of being aligned with one or more corresponding mounting holes 178 disposed in the shank mount 176 of the accessory support 170.

It should be understood the plurality of mounting positions available for the accessory support 170 and the hitch support 180 may enable alignment of the shank 181 of the hitch support 180 to the vehicle trailer hitch 18. It should also be understood that there may be several combinations of positions for the accessory support 170 and the hitch support 180 that achieve such alignment. In installing the accessory support 170 and the hitch support 180, the ultimate position used may depend not only on alignment of the shank 181 with the vehicle trailer hitch 18, but also, in some circumstances, may depend on a desired height of the accessory support 170 relative to the ground. For example, in installation, the type of accessory 30 being installed on the accessory support 170 may be known and have particular installation parameters, such as a required ground clearance or a specific mounting configuration. The accessory support 170 may be positioned to accommodate the installation parameters of the accessory 30 being installed.

In an effort to allow use of several different types of accessories 30, accessory support 170 of the vehicle accessory hitch assembly 110 may include a plurality of accessory mounts 31-38 disposed at several locations on the accessory support 170. The accessory mounts 31-38 may accommodate different connection configurations between an accessory 30 and the accessory support 170. As a result, a first accessory having a first type of connection configuration may be connected to the accessory support 170, and a second accessory having a second type of connection conversion may also be connected to the accessory support 170.

The mechanical connection between the first and second elongate members 132, 142 and the first and second base rails 14, 16 according to one embodiment is shown in FIGS. 3, 4, 5 and 18. The connection members 134, 136 of the first elongate member 132 may be fastened via fasteners 156 to a coupler, such as the coupler 150 in the illustrated embodiment of FIG. 18.

The coupler 150 may include one or more coupler holes that accept a hitch pin 152. The coupler 150 may be sized to fit within an aperture 17 of the first and second base rails 14, 16. Once received, the hitch pin 152 may be slid through a corresponding hitch pin hole 15 of the first and second base rails 14, 16 and the coupler hole of the coupler 150, thereby forming a mechanical connection between the first and second base rails 14, 16 and the respective coupler 150. Several mechanical connections of this type may be achieved through the use of multiple couplers 150, as depicted in the illustrated embodiment of FIG. 3.

In some circumstances, there may be multiple standard sizes for the hitch pin holes 15 of the first and second base rails 14, 16. As a result, there is the possibility that the coupler hole of the coupler 150 may be undersized or oversized for the first and second base rails 14, 16 used in a particular configuration. To accommodate different sizes, the coupler 150 may be constructed with multiple coupler holes 154, 158 having different sized apertures at each end. Other than the different sized coupler holes 154, 158, the coupler 150 may be generally symmetric. In this way, the coupler 150 according to one embodiment may be flipped or rotated, prior to fastening to the connection members 134, 136, to accommodate the base rails to which the vehicle accessory hitch assembly 110 is being connected.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A vehicle accessory hitch for attaching an accessory to a vehicle, the vehicle having a frame and a bed mounted to the frame, the vehicle having first and second base rails disposed on the bed and coupled to the frame of the vehicle, the vehicle having a vehicle trailer hitch with a receiver for accepting a shank, said vehicle accessory hitch comprising:
   a first member opposing a second member, each of the first and second members including a bed section and a rear section, the bed section configured to extend along the bed of the vehicle, the rear section configured to be in proximity to the rear of the vehicle, each said bed section of the first and second members configured to fixedly couple to the first and second base rails of the vehicle;
   a hitch support fixedly coupled to a shank mount of the vehicle accessory hitch, said hitch support having a shank member configured to interface with the receiver of the vehicle trailer hitch, wherein the vehicle accessory hitch is configured to fixedly couple to the first base rail of the vehicle, the second base rail of the vehicle, and the vehicle trailer hitch of the vehicle;
   an accessory support fixedly coupled to said first member, said second member and said hitch support, said accessory support configured to connect to and support a vehicle accessory near the rear of the vehicle.

2. The vehicle accessory hitch of claim 1 wherein said accessory support is a rear mountable snowplow.

3. The vehicle accessory hitch of claim 1 wherein said hitch support is fixedly coupled to said first and second members via said accessory support, wherein said accessory support is mechanically connected to said hitch support, said first member, and said second member, wherein said accessory support includes a frame mechanically connected to said first member and said second member between said rear section of said first member and said rear section of said second member.

4. The vehicle accessory hitch of claim 1 wherein said accessory support includes a plurality of mounting points capable of providing a plurality of connection configurations, wherein each of said connection configurations accommodates a different type of vehicle accessory.

5. The vehicle accessory hitch of claim 1 wherein said bed section includes first and second connectors, each of said first and second connectors having a connection member and a coupler configured to respectively attach to the first and second base rails of the vehicle.

6. The vehicle accessory hitch of claim 1 wherein each of said couplers is configured to fit through an aperture respectively defined by the first and second base rails, and each of said couplers is configured to accept a hitch pin in an installed position such that said hitch pin prevents said coupler from being pulled through the aperture.

7. The vehicle accessory hitch of claim 1 wherein each of said bed sections includes an elongate member, and each of said rear sections includes a beam.

8. The vehicle accessory hitch of claim 1 wherein each of said rear sections is removably fixed to each of said bed sections via a fastener, wherein a position of each of said rear sections relative to the rear of the vehicle is adjustable by removing said fastener to enable adjustment of a relative position between each of said rear sections and each of said bed sections and reinstalling said fastener.

9. The vehicle accessory hitch of claim 1 wherein each of said bed sections is directly connected to the first vehicle rail and the second vehicle rail.

10. The vehicle accessory hitch of claim 1 wherein the first and second vehicle rails connect to one or more vehicle mounting points common to a make of the vehicle.

11. A vehicle accessory hitch system for attaching an accessory to a vehicle, the vehicle having a frame and a bed mounted to the frame, the vehicle having a vehicle trailer hitch with a receiver for accepting a shank, the vehicle having one or more frame mounting points common to a make of the vehicle, said vehicle hitch comprising:
  a first rail member configured to couple to at least one of the frame mount points through a surface of the bed, a second rail member configured to couple to at least one of the frame mounting points through the surface of the bed;
  a first hitch member opposing a second hitch member, each of the first and second hitch members including a bed section and a rear section, the bed section configured to extend along the bed of the vehicle, the rear section configured to be in proximity to the rear of the vehicle, each of said bed sections of the first and second members being fixedly coupled to said first and second base rails;
  a hitch support fixedly coupled to a shank mount of the vehicle accessory hitch, said hitch support having a shank member configured to interface with the receiver of the vehicle trailer hitch, wherein the vehicle accessory hitch is configured to fixedly couple to the vehicle via said first and second base rails and the vehicle trailer hitch; and
  an accessory support fixedly coupled to said first member, said second member and said hitch support, said accessory support configured to connect to and support a vehicle accessory near the rear of the vehicle.

12. The vehicle accessory hitch of claim 11 wherein said first and second base rail members includes a plurality of apertures for accepting fasteners that respectively connect said bed sections and said first and second base rail members.

13. The vehicle accessory hitch of claim 11 wherein each of said rear sections is adjustably fixed to each of said bed sections via a fastener, wherein a position of each of said rear sections relative to the rear of the vehicle is adjustable by removing said fastener to enable adjustment of a relative position between each of said rear sections and each of said bed sections and reinstalling said fastener, whereby each of said rear sections being removably fixed to each of said bed sections enables said vehicle accessory hitch to be used in connection with a plurality of vehicle makes, each of the vehicle makes having a different distance between the one or more mounting points and the rear of the vehicle.

14. The vehicle accessory hitch of claim 11 wherein said accessory support is adjustably fixed to each of said first and second hitch members such that a distance between said accessory support and a vehicle ground is variable.

15. The vehicle accessory hitch of claim 11 wherein the vehicle accessory is a rear mountable snow plow.

16. The vehicle accessory hitch of claim 15 wherein the accessory support includes a plurality of mounting points capable of providing a plurality of connection configurations, wherein each of said connection configurations enables connection to a different type of rear mountable snowplow.

17. The vehicle accessory hitch of claim 16 wherein at least one of said connection configurations is a standard connection arrangement for at least one type of rear mountable snowplow.

18. A method of attaching a vehicle accessory hitch to a vehicle, the vehicle having a frame and a bed mounted to the frame, the vehicle having first and second base rails disposed on the bed and coupled to the frame of the vehicle, the vehicle having a vehicle trailer hitch with a receiver for accepting a shank, the method comprising:
  fixedly connecting a first hitch member to each of the first and second base rails such that the first hitch member is stationary relative to the first and second base rails; wherein the first hitch member includes a first bed section extending along the bed of the vehicle and includes a first rear section disposed in proximity to a rear of the vehicle;
  fixedly connecting a second hitch member to each of the first and second base rails such that the first hitch member is stationary relative to the first and second base rails, the second hitch member being in an opposing position relative to the first hitch member, wherein the first hitch member includes a second bed section extending along the bed of the vehicle and includes a second rear section disposed in proximity to a rear of the vehicle;
  attaching an accessory support to the first and second hitch members, the accessory support configured to enable mounting of a vehicle accessory to the vehicle accessory hitch; and
  inserting a shank member into the receiver of the vehicle trailer hitch to aid in mechanically stabilizing the first and second hitch members relative to the vehicle trailer hitch, the shank member being stationary relative to the accessory support.

19. The method of claim 18 further comprising coupling the vehicle accessory to the accessory support.

20. The method of claim 18 further comprising:
  adjusting a first position of the first rear section relative to the rear of the vehicle by changing a relative position between the first rear section and the first bed section;
  adjusting a second position of the second rear section relative to the rear of the vehicle by changing a relative position between the second rear section and the second bed section;
  whereby said adjusting the first position and the second position enables the vehicle accessory hitch to be used in connection with a plurality of vehicle makes, each of the vehicle makes having a different distance between the one or more mounting points and the rear of the vehicle.

* * * * *